(12) United States Patent
Cheng et al.

(10) Patent No.: US 11,735,407 B2
(45) Date of Patent: Aug. 22, 2023

(54) IONIZATION DEVICE, MASS SPECTROMETER, ION MOBILITY SPECTROMETER, AND IONIZATION METHOD

(71) Applicant: SHIMADZU RESEARCH LABORATORY (SHANGHAI) CO. LTD., Shanghai (CN)

(72) Inventors: Yupeng Cheng, Shanghai (CN); Wenjian Sun, Shanghai (CN)

(73) Assignee: SHIMADZU RESEARCH LABORATORY (SHANGHAI) CO. LTD., Shanghai (CN)

( * ) Notice: Subject to any disclaimer, the term of this patent is extended or adjusted under 35 U.S.C. 154(b) by 13 days.

(21) Appl. No.: 17/048,721

(22) PCT Filed: Mar. 27, 2019

(86) PCT No.: PCT/CN2019/079871
§ 371 (c)(1),
(2) Date: Oct. 19, 2020

(87) PCT Pub. No.: WO2019/201064
PCT Pub. Date: Oct. 24, 2019

(65) Prior Publication Data
US 2021/0151305 A1 May 20, 2021

(30) Foreign Application Priority Data
Apr. 20, 2018 (CN) .......................... 201810360021.2

(51) Int. Cl.
*H01J 49/04* (2006.01)
*H01J 49/00* (2006.01)

(52) U.S. Cl.
CPC ........ *H01J 49/049* (2013.01); *H01J 49/0031* (2013.01); *H01J 49/0413* (2013.01)

(58) Field of Classification Search
CPC ... H01J 49/049; H01J 49/0031; H01J 49/0413
(Continued)

(56) References Cited

U.S. PATENT DOCUMENTS

| 6,884,999 B1 * | 4/2005 | Yedur | H01L 22/20 |
| | | | 369/126 |
| 8,384,020 B2 * | 2/2013 | Jesse | G01Q 60/38 |
| | | | 250/281 |

(Continued)

FOREIGN PATENT DOCUMENTS

| CN | 102969217 B | 7/2015 |
| CN | 105021718 A | 11/2015 |

(Continued)

OTHER PUBLICATIONS

State Intellectual Property Office of the P.R. China (ISR/SIPO), "International Search Report for PCT/CN2019/079871", CN, dated Jun. 2019.

(Continued)

*Primary Examiner* — Nicole M Ippolito
(74) *Attorney, Agent, or Firm* — Locke Lord LLP; Tim Tingkang Xia, Esq.

(57) ABSTRACT

The present invention relates to the field of mass and/or ion mobility spectrometers. Provided is an ionization device and a mass spectrometer and an ion mobility spectrometer having same. Further provided is an ionization method. A sampling probe of the ionization device of the present invention is able to actively and rapidly collect samples, while a sampling device and a thermal desorption device are combined into one, simplifying and compacting the sampling device. An ionization part is provided downstream of the sampling and desorption part, ensuring that the sampling probe will not interfere with a flow field or an electric field between the ionization part and the analysis assembly inlet, (Continued)

thus ensuring repeatability of the device signal and flexibility of analysis.

21 Claims, 6 Drawing Sheets

(58) Field of Classification Search
USPC .................................. 250/281, 282, 283, 288
See application file for complete search history.

(56) References Cited

U.S. PATENT DOCUMENTS

| | | | |
|---|---|---|---|
| 8,754,365 B2 | 6/2014 | Krechmer et al. | |
| 2005/0112027 A1* | 5/2005 | Arii | H01J 49/0009 422/80 |
| 2005/0196791 A1* | 9/2005 | Koopman | A61K 47/6809 435/6.19 |
| 2009/0140137 A1* | 6/2009 | Hiraoka | G01N 30/7266 250/282 |
| 2011/0011190 A1* | 1/2011 | Subramaniam | H01J 37/3053 73/866.5 |
| 2012/0074206 A1* | 3/2012 | Qin | H01L 22/20 228/102 |
| 2012/0074306 A1* | 3/2012 | Jesse | H01J 49/0413 250/282 |
| 2015/0276559 A1* | 10/2015 | Ovchinnikova | G01Q 30/02 850/9 |
| 2018/0337029 A1* | 11/2018 | Piper | H01J 49/049 |

FOREIGN PATENT DOCUMENTS

| | | |
|---|---|---|
| CN | 106525955 A | 3/2017 |
| CN | 107561151 A | 1/2018 |
| JP | 2013254752 A | 12/2013 |
| WO | 2012040559 | 3/2012 |

OTHER PUBLICATIONS

Wilson, H. W. et al., "Mass spectrometry of solids", J. Sci. Instrum., 1963, vol. 40, pp. 273-285.

* cited by examiner

IONIZATION DEVICE, MASS SPECTROMETER, ION MOBILITY SPECTROMETER, AND IONIZATION METHOD

TECHNICAL FIELD

The invention relates to the field of mass spectrometers or ion mobility spectrometers, in particular to a device for ionizing mass spectrometry samples or ion mobility spectrometry samples.

BACKGROUND

With the wide application of liquid chromatogram-mass spectrum systems to the analysis of complex mixtures, ion sources working under the atmospheric pressure, such as electrospray ion sources and atmospheric-pressure chemical ion sources, have been used in the fields of food security, environmental protection, national security and the like. However, in the analysis process, a lot of time is spent in pre-processing performed before a sample is imported into an analysis system, which hinders further application and popularization of the ion analysis technique in industrial and commercial fields.

In recent years, the emergence of more and more direct analysis methods, such as Desorption Electrospray Ionization (DESI), Direct Analysis in Real Time (DART), Atmospheric-pressure Solid Analysis Probe (ASAP) and Desorption Atmospheric Pressure Chemical Ionization (DAPCI), has alleviated this problem.

The direct-analysis ion resource can directly analyze samples with matrixes, without carrying out pre-processing and chromatographic separation on the samples. A typical analysis process includes the following two steps: first, a to-be-measured substance in a solid or liquid sample is desorbed from an original condensed state to form droplets, aerosol, molecules, atoms or the like; and second, the desorbed to-be-measured substance is mixed with various reactants, such as ions, electrons, photons and metastable atoms, to carry out an ionization reaction so as to generate to-be-measured ions.

Wherein, desorption is carried out typically by transmitting sufficient energy to samples to allow the samples to get free from the intermolecular force. According to different energy acquisition ways, many methods, such as heating, laser, ultrasounds, acoustic surface waves and particle bombardment, can be adopted to realize desorption of samples. Wherein, as the most common thermal desorption method, samples can be heated to be thermally desorbed.

Thermal desorption was traditionally applied to thermal ionization mass spectrometry to measure the isotopic abundance. H. W. WILSON et al., gives an introduction of a single-probe structure and a three-probe structure used for thermal ionization mass spectrometry, in review article J. SCI. NSTRUM., 1963, VOL. 40, 273-285. Because of a long isotopic abundance measurement time, the probe for desorption needs to be kept at a temperature below that of the probe for thermal ionization for a long time to obtain lasting and valid sample signals; and in addition, to guarantee a high ionization efficiency and the life of a filament, the heating filament needs to be placed under an extremely low atmospheric pressure and cannot be used near a normal pressure, which puts forwards high requirements for the operating environment of the device.

Thermal desorption can also be used for mass spectrum imaging analysis in a two-dimensional plane. PCT Patent WO2012040559 discloses a device for analyzing chemical components on the surface of a sample by a nanoprobe, wherein the pointed end of the probe of the device can be heated to be over 200° C.; when applied to the surface of the sample, the probe can gasify substances in an extremely small region of the surface of the sample, and then the chemical components of the gasified substance are analyzed through an ionization device and an analysis device, so that high-resolution sampling and analysis in the two-dimensional plane are realized. However, to fulfill the purpose, namely high-resolution sampling and analysis in the two-dimensional plane, of the device, the carrier for carrying the sample and the probe for heating the sample have to be arranged separately, which leads to a complicated structure and operation of the device and failure to realize quick sampling; and the number of samples desorbed every time is limited, and the analysis sensitivity is low.

In recent years, researchers put forward a direct-analysis ion source based on thermal desorption by combining the thermal desorption technique and the direct-analysis ion resource. As shown in FIG. 1, American U.S. Pat. No. 8,754,365 discloses an ionization device for direct analysis, wherein a sample carrier of a desorption part of the ionization device is a wire mesh 102 arranged between an ionization component 101 and an analysis assembly inlet 103. In use, a sample can be placed on the wire mesh 102, and then the wire mesh 102 is heated to allow the sample to be desorbed.

However, the reproducibility of signals, the sensitivity and speed of analysis and the portability cannot be guaranteed at the same time due to the arrangement sequence of the wire mesh 102, the ionization component 101 and the analysis assembly 103 in this technical solution. For example, when the ion source 101 on the left in FIG. 1 is a DART ion source, metastable atoms, ions or electrons are conveyed to the wire mesh 102 by a carrier gas device, and the sample on the wire mesh 102 is thermally desorbed, then reacts with the metastable substances to be ionized, and finally enters a mass spectrometry inlet 103 along with carrier gas; and the wire mesh 102 arranged between the ion source 101 and the mass spectrometry inlet 103 will disturb a carrier gas flow field, and the stability of signals eventually entering the mass spectrometry inlet 103 is affected. Even if the mass transfer process of the ion source 101 is driven by an electric field rather than carrier gas, the wire mesh 102 will disturb the electric field between the ion source 101 and the mass spectrometry inlet 103, thus affecting the reproducibility of analysis.

In addition, Patent CN102969217 discloses a thermal desorption device for a mass spectrometry system. According to the thermal desorption device, a sampling probe attached with a to-be-measured substance is placed in a heating channel to realize thermal desorption of the to-be-measured substance to generate a gas-phase to-be-measured substance, which is then subjected to an ionization reaction with charged droplets generated by an ionization device to generate to-be-measured ions for mass spectrometry. The probe is heated in the heating channel of the device by means of thermal radiation or thermal convection, so that the heating efficiency is low, and a high heating rate and a high upper temperature limit are not available. In addition, when used to power consumption-sensitive portable instruments, the solution may generate a large heat loss and thus is not suitable for wide application and popularization. Moreover, the heating channel of the device is prone to contamination and results in a memory effect, thus affecting sample analysis.

Therefore, the thermal desorption and ionization devices in the prior art have the problems of high requirements for operating environments, complicated structure and operation, low analysis sensitivity, poor reproducibility and the like. Particularly, a technical solution for solving these problems is not available yet.

SUMMARY

In view of the above-mentioned problems of the prior art, the invention provides an ionization device, which can directly acquire a sample by means of a probe and can realize quick desorption of the acquired sample on the probe, thus guaranteeing the reproducibility and sensitivity of analysis and improving the efficiency in the whole analysis process.

The invention provides an ionization device which comprises a sampling desorption part and an ionization part. The sampling desorption part comprises a sampling probe and a heating assembly, wherein the sampling probe is detachably mounted on the sampling desorption part and is used to actively acquire a sample, the heating assembly is used to heat the sampling probe under or near the normal pressure to enable the sample to be desorbed on the surface of the sampling probe, and the ionization part is arranged downstream the sampling desorption part in a mass transfer direction of the sample.

In the technical solution provided by the invention, the sampling probe of the ionization device is able to actively acquire the sample after being dismantled from the sampling desorption part by a user and is directly heated under or near the normal pressure after being reassembled back onto the sampling desorption part; or, the sampling probe is driven by a probe driving part to move to actively acquire the sample. The whole process is simple and quick, and neither sample transferring nor vacuumizing is needed; a sampling device and a desorption device are integrated, so that the sampling device is simpler and more compact; the ionization part is arranged downstream the sampling desorption part, so that a flow field or an electrical field of the ionization part in the mass transfer direction will not be disturbed by the sampling probe, thus guaranteeing the signal reproducibility and analysis sensitivity of the device; and in addition, the heating assembly directly heats the sampling probe, so that the heat efficiency in the heating process can be improved, the sample can be desorbed more efficiently, and the efficiency in the analysis process is improved, accordingly.

Those skilled in the art would appreciate that "under or near the normal pressure" in the invention refers to an atmospheric pressure or a vacuum condition slightly lower than the atmospheric pressure.

In a preferred technical solution of the invention, the heating rate of the sampling probe within a specified time in the heating process of the sampling probe is over 100 K/s. Rapid heating of the sampling probe can increase the desorption rate of the sample; when the heating rate exceeds a certain range, liquid samples can still be desorbed on the surface of the sampling probe in the form of droplets, so that dissociation of some samples, prone to thermal decomposition, under a high temperature is avoided, thus reducing the destruction to molecular structures of the samples and expanding the varieties of samples that can be measured by the device. According to different varieties of samples and different heating rates, a mass-transfer liquid generated by rapid heating may also be, but not limited to, in the form of aerosol, gas molecules, ions, atoms, or the like. Preferably, the heating rate of the sampling probe is one selected from: (i) 100-150 K/s, (ii) 150-200 K/s, (iii) 200-250 K/s, (iii) 200-250 K/s, (iv) 250-300 K/s, (v) >200 K/s, or (vi) >300 K/s.

In a preferred technical solution of the invention, the heating assembly is an AC or DC power supply. Furthermore, the heating assembly is a dry battery, a storage battery or a lithium battery. By using the battery as the heating assembly, the portability of the device can be improved, and daily maintenance is facilitated.

In a preferred technical solution of the invention, the sampling probe is made of a filament-shaped, sheet-shaped, tubular-shaped, strip-shaped or membrane-shaped conductor. The sampling probe made of the filament-shaped, sheet-shaped, tubular-shaped, strip-shaped or membrane-shaped conductor has a smaller cross-sectional area, so that the specific surface area of the sampling probe is enlarged, and the heating rate and cooling rate of the sampling probe are increased; in addition, by reducing the cross-sectional area, the resistance of the conductor in unit length can be increased to ensure that most electric energy is consumed on the probe, and energy losses on a wire are reduced. Generally speaking, after the device is powered on, only the sampling probe is heated, all the other parts are maintained under the ambient temperature, so that the heat efficiency is extremely high, and power consumption is extremely low.

Preferably, the cross-sectional area of the conductor is less than 10 mm$^2$. Further preferably, the cross-sectional area of the conductor is one selected from: (i) <1 mm$^2$, (ii) 1-2 mm$^2$, (iii) 2-4 mm$^2$, (iv) 4-6 mm$^2$, (v) 6-8 mm$^2$, and (vi) 8-10 mm$^2$.

Furthermore, the resistivity of the conductor under a normal temperature is greater than 4E-8 Ω·m. By making the sampling probe through a high-resistivity conductor, the resistance of the sampling probe can be further increased, so that more heat can be generated to rapidly heat the sampling probe under the same current condition.

Furthermore, the conductor is made of a metal element including titanium, ferrum, cobalt, gallium, nickel, chromium, molybdenum, rhodium, iridium, chromium, tungsten, rhenium or molybdenum, or one of more of alloy materials of titanium, ferrum, cobalt, gallium, nickel, chromium, molybdenum, rhodium, iridium, chromium, tungsten, rhenium and molybdenum. The sampling probe made of the metal conductor has certain ductility and can be bent into any suitable shapes to facilitate sample acquisition; and the metal conductor has appropriate heat resistance and appropriate electrical conductivity, thus prolonging the service life of the sampling probe and improving the heating efficiency.

Furthermore, the cross-sectional shape of the conductor is circular or rectangular, and is more preferably circular. Because the sampling probe of the invention needs to actively acquire the sample and may deform when acquiring the sample, the circular cross-section is adopted to avoid resistance changes when the sampling probe deforms, so that drifts of the heating rate of the probe caused by resistance changes are reduced.

In a preferred technical solution of the invention, the sample acquired by the sampling probe is a polypeptide sample. The polypeptide sample is generally a polypeptide solution. Specifically, in some preferred embodiments of the invention, when the sampling probe is heated at a high rate, local boiling of the polypeptide solution sample can be induced to enable the sample to be desorbed on the surface of the sampling probe in the form of droplets, so that dissociation caused by slow heating of the polypeptide sample to a high temperature is avoided.

In a preferred technical solution of the invention, the heating assembly comprises a temperature control part and a temperature detection part, wherein the temperature control part is able to control the on-off and/or power of the heating assembly according to temperature information fed back by the temperature detection part. The temperature control part and the temperature control part can strictly control the heating temperature of the sampling probe and design an appropriate heating curve according to sample varieties and analysis targets, so that the flexibility of the ionization device in use is greatly improved.

Furthermore, the temperature control part at least comprises a first heating module and a second heating module, wherein the first heating module is able to control and heat the sampling probe to enable a first component on the sampling probe to be desorbed, and the second heating module is able to control and heat the sampling probe to enable a second component on the sampling probe to be desorbed. By gradually heating the sample through different heating modules, different components in the sample can be desorbed at different times and under different temperatures, and the device can separate different components in the sample.

Furthermore, the temperature control module further comprises a third heating module, wherein the third heating module is able to control and heat the sampling probe to enable the sample on the sampling probe to be burned out. The temperature control part is able to control the sampling probe to be heated to a preset high-temperature state to burn out the sample on the surface of the sampling probe, so that the surface of the sampling probe is kept clean, and experimental results will not be affected by residual samples when the probe is used again.

In a preferred technical solution of the invention, the heating assembly is able to heat the sampling probe to be over 1000° C. A high heating temperature can burn out the sample after measurement and can realize thermal desorption of some non-volatile samples, so that the range of samples that can be analyzed by the device is widened. In some preferred embodiments, the sampling probe may be made of a filament-shaped, membrane-shaped, sheet-shaped or strip-shaped metal or alloy material, such sampling probe has a high heating rate and high cooling rate because of its large specific surface area and small size, low detection efficiency caused by slow cooling is avoided, and thus, burning-out is particularly suitable for processing the sampling probe.

In a preferred technical solution of the invention, the heating assembly is an electromagnetic field generator, and the sampling probe is made of a ferromagnetic material and is arranged in a high-frequency electromagnetic field generated by the electromagnetic field generator. Heating of the ferromagnetic sampling probe in the high-frequency electromagnetic field provides another device design for rapidly heating the sampling probe.

Furthermore, the electromagnetic field generator is a solenoid or a vortex tube, and the sampling probe is arranged on the central axis of the solenoid or the vortex tube. In this way, the change rate of magnetic flux around the sample probe and the induced vortex current in the sampling probe are increased, and the heating rate of the sampling probe is increased, accordingly.

In a preferred technical solution of the invention, the ionization part comprises at least one of an electrospray ion source, a glow discharge ion source, a dielectric barrier discharge ion source, a corona discharge ion source and a photoelectric ion source, which can improve the analysis efficiency of the device to the maximum extend in cooperation with a direct-analysis ionization source, so that the ionization device in the preferred technical solution is more suitable for industrial application. Preferably, the ionization part is an electrospray ion source or a glow discharge ion source. The electrospray ion source is more suitable for medium-polarity and strong-polarity samples. The glow discharge ion source is more suitable for medium-polarity or weak-polarity samples. More preferably, the glow discharge ion source is arranged inside the analysis assembly.

In a preferred technical solution of the invention, reaction particles generated by the ionization part include at least one of charged droplets, ions, electrons, photons and metastable atoms.

In a preferred technical solution of the invention, the ionization part is an indoor-pressure ionization source and/or a low-pressure ionization source. Furthermore, the ionization part comprises an indoor-pressure ionization source and a low-pressure ionization source, wherein the indoor-pressure ionization source is arranged outside the analysis assembly, and the low-pressure ionization source is arranged inside the analysis assembly. By adoption of the indoor-pressure ionization source and the low-pressure ionization source, different components in the sample can be ionized, and more sample information can be obtained by the device; and the device can be applied to more varieties of samples.

Furthermore, the working pressure of the low-pressure ionization source is 50 Pa-500 Pa, 500 Pa-5000 Pa, or 5 kPa-50 kPa.

In a preferred technical solution of the invention, the ionization device further comprises a carrier gas generation device used to generate an auxiliary air flow to transfer the desorbed sample to the ionization part.

To sum up, in the preferred technical solution of the invention, the sampling probe of the ionization device can actively and rapidly acquire the sample; the sampling device and the thermal desorption device are integrated, so that the sampling device is simpler and more compact; and the thermal desorption device is made of a filament-shaped or strip-shaped material with a high resistivity, so that more heat can be generated under the same current condition, the heating rate is high, and the heat efficiency is high. Because both the heating rate and the cooling rate are high, the analysis time of a single sample can be greatly shortened, and the analysis flux is increased. Moreover, a thermospray process can be induced by rapid heating to avoid dissociation of some samples, prone to thermal decomposition, under a high temperature when liquid samples are separated and thermally desorbed on the surface of the probe in the form of droplets, so that the device can avoid or reduce the destruction to the molecular structures of the samples. In addition, the ionization part is arranged downstream the sampling desorption part, so that a flow field or an electric field of the ionization part in the mass transfer direction will not be disturbed by the sampling probe, and the signal reproducibility and analysis sensitivity of the device are guaranteed.

The invention provides a mass spectrometer with the ionization device as well as an ion mobility spectrometer with the ionization device.

The invention further provides an ionization method which comprises the following steps: dismantling a sampling probe from a sampling desorption part, and actively acquiring a sample by the sampling probe; heating the sampling probe by a heating assembly under a normal pressure to enable the sample to be desorbed on the surface of the sampling probe; transferring the desorbed sample to an ionization part arranged downstream in a mass transfer direction of the sample; and ionizing the desorbed sample.

The ionization method provided by the invention can fulfill ionization easily and rapidly, can obtain stable sample signals, and improves the sensitivity of analysis in the subsequent stage.

In a preferred technical solution of the invention, the heating process of the sampling probe at least comprises a first heating stage and a second heating stage, wherein a first component on the sampling probe is desorbed in the first heating stage, and a second component on the sampling probe is desorbed in the second heating stage. The heating process is implemented in a manner of gradual heating, in the first heating stage, the sampling probe is heated to $T_1$ to enable a component, with a low boiling point, in the sample on the sampling probe to be desorbed. Preferably, when the temperature rises to a target temperature in the first heating stage, the temperature can be maintained at $T_1$ for a period of time until the component with the low boiling point is completely desorbed; and in the second stage, the sampling probe is heated to $T_2$ to enable a second component in the sample to be desorbed. Of course, these skilled in the art can flexibly configure other heating modules or adjust the heating curve according to actual sample varieties and analysis contents to separate to-be-measured components in the sample from interference signals, to the maximum extent.

In a preferred technical solution of the invention, the heating process of the sampling probe further comprises a third heating stage in which the sample on the sampling probe is burned out. Due to the fact that the sampling probe of the invention acquires samples by direct contact, cross contamination of the samples may be caused if the sampling probe fails to be thoroughly cleaned, and measurement results may be affected. In this preferred technical solution, the sample on the sampling probe is burned out at a high temperature in the third heating stage, so that the sampling probe can be cleaned easily and rapidly. In some embodiments of this technical solution, the sampling probe is made of a filament-shaped, sheet-shaped, membrane-shaped or strip-shaped metal, which has high cooling efficiency, so that the cooling rate will not be reduced, and high-temperature burning-out is particularly suitable for processing the sampling probe.

In a preferred embodiment of the invention, in the step of actively acquiring a sample by a sampling probe, the sampling probe is heated to acquire the sample. The heated probe can carry out some sampling operations that cannot be performed by a common-temperature probe, for example, the heated probe can burn the surface of an object and then acquire a sample below the surface of the object.

DETAILED DESCRIPTION

The preferred embodiments of the invention are described below with reference to the accompanying drawings. Those skilled in the art would appreciate that these embodiments are merely used to explain the technical principle of the invention and are not intended to limit the protection scope of the invention. Modifications of these preferred embodiments can be made by those skilled in the art as required to adapt to specific applications.

It should be noted that in the description of the preferred embodiments of the invention, the terms such as "upper", "lower", "left", "right", "front", "back", "vertical", "horizontal", "inner" and "outer" are used to indicate directional or positional relations on the basis of the accompanying drawings to facilitate description, do not indicate or imply that the devices or constituent parts referred to must have specific directions or must be configured and operated in specific directions, and thus, should not be construed as limitations of the invention.

Embodiment 1

Figure 1:
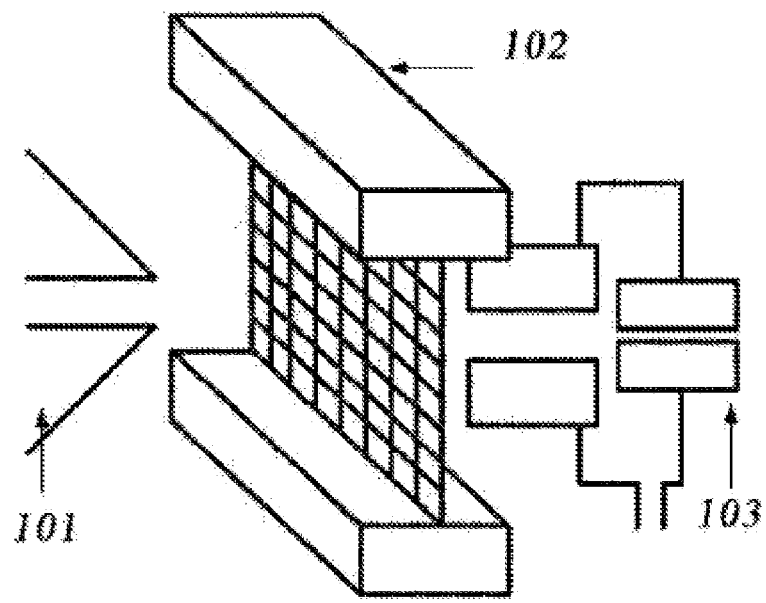
FIG. 1 is a structural diagram of a direct-analysis ionization device in the prior art.
Figure 2:
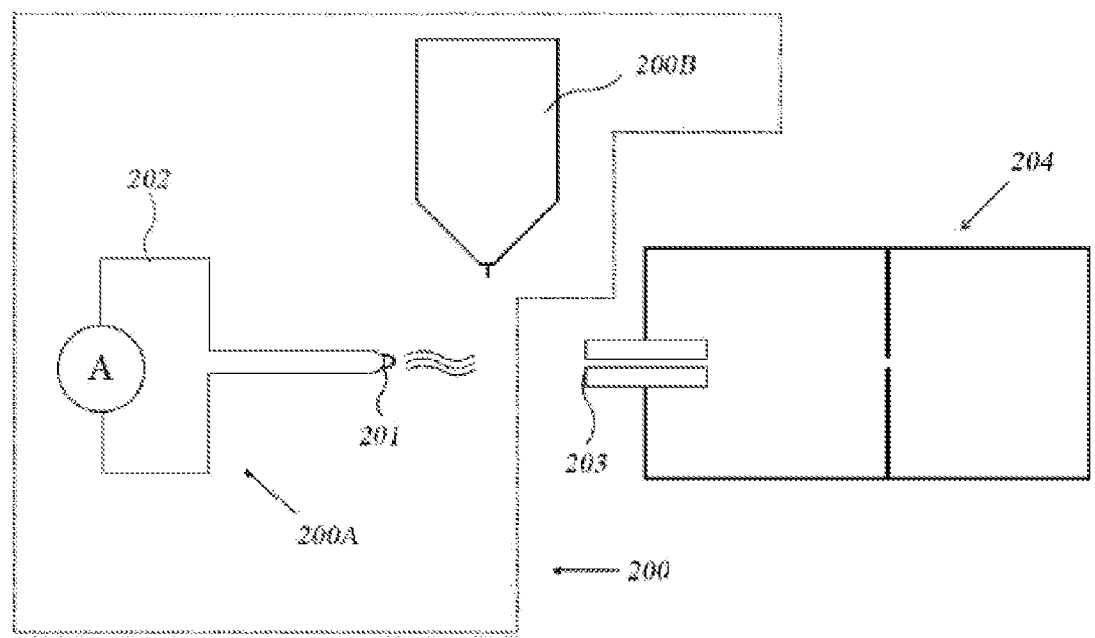
FIG. 2 is a structural diagram of a mass spectrometer in one embodiment of the invention.

This embodiment provides an ionization device, which is applied to a mass spectrometer and has a structure shown in FIG. 2. The mass spectrometer comprises an ionization device 200 and an analysis assembly 204. The ionization device comprises a sampling desorption part 200A and an ionization part 200B, wherein the sampling desorption part 200A comprises a sampling probe 201 and a heating assembly 202, and the sampling probe 201 can be separated from the sampling desorption part 200A; a user can dismantle the sampling probe 201 from the sampling desorption part 200A, then enables the sampling probe 201 to directly touch a sample through point contact, dipping, soaking, wiping or the like, and assembles the sampling probe 201 back onto the sampling desorption part 200A to realize sampling. Or, the sampling probe 201 can be driven by a probe driving part (not shown) to move to the sample to realize active sampling. This structural design makes sampling easier and faster, so that the ionization device 200 in this embodiment can realize rapid analysis of the sample and is suitable for industrial popularization.

The heating assembly 202 is a current source and is used to heat the sampling probe 201. After being heated, the sample is thermally desorbed on the surface of the sampling probe 201 to form a gaseous mobile phase, which is diffused or transferred to the ionization part 200B arranged downstream a mobile phase passageway to react with reaction particles generated by the ionization part 200B to realize ionization, so that to-be-tested ions are formed.

The sampling probe 201 in this embodiment can be heated under or near a normal pressure, complicated and time-consuming steps of vacuumizing and exhausting are not needed, the structure of the device is simplified, and the analysis efficiency is improved. Meanwhile, different from a mass transfer method, in the prior art, that an ion source delivers reaction particles to a sample, in this embodiment, the ionization part 200B is arranged downstream the sampling desorption part 200A in the mass transfer direction of the sample, that is, the sample is desorbed by the sampling desorption part 200A at first and is then transferred to the ionization part 200B. In this way, the sampling probe 201 will not disturb a flow field or an electric field between the ionization part 200B and an analysis assembly inlet 203, so that stable to-be-measured ions can be provided, and the reproducibility of analysis is guaranteed. In addition, the heating assembly 202 directly heats the sampling probe 201 loaded with the sample, so that the heat efficiency in the heating process can be improved, the sample can be desorbed more efficiently, the efficiency in the analysis process is improved, and the ionization device is more suitable for rapid and efficient industrial application.

Therefore, on the basis of the ionization device 200 in this embodiment, rapid thermal desorption of the sample under the normal pressure can be realized through a simple device structure, stable ionization of the desorbed sample can be ensured, a stable to-be-measured ion source is provided for subsequent mass spectrometry, and the analysis reproducibility and sensitivity of the mass spectrometer are improved, accordingly.

This embodiment further provides a method for forming a to-be-measured ion source by means of the ionization device 200. The steps of the method are illustrated below:

The sampling probe 201 is dismantled from the sampling desorption part 200A and directly acquires a sample from a test tube by way of dipping;

The sampling probe 201 is placed back onto a heating station, and then a cover is closed;

A power switch of the heating assembly 202 is turned on, the output power of the heating assembly 202 is set, and then heating is started;

The sample 302 is desorbed from the surface of the sampling probe 201;

After being desorbed, the sample is transferred to the ionization part 200B disposed downstream in the mass transfer direction of the sample, and the ionization part 200B generates reaction particles which react with the desorbed sample to ionize the sample, so that to-be-measured ions are formed.

According to the method, rapid thermal desorption of the sample under the normal pressure can be realized through a simple device structure, stable ionization of the desorbed sample can be ensured, a stable to-be-measured ion source is provided for subsequent mass spectrometry, and the analysis reproducibility and sensitivity of the mass spectrometer are improved, accordingly.

Figure 9:
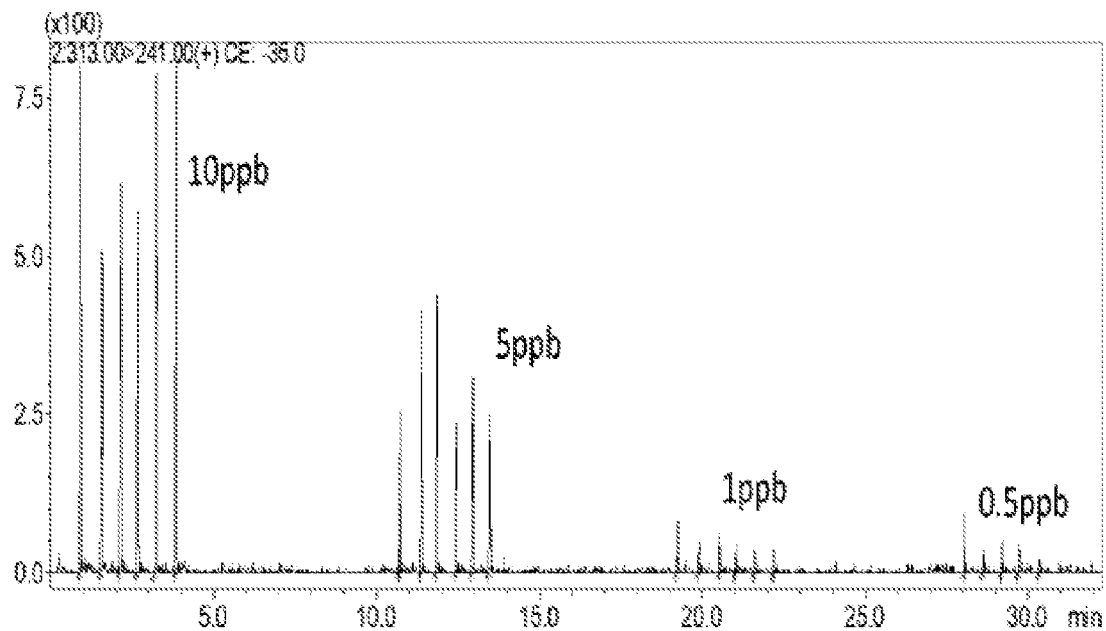
FIG. 9 is an ion current diagram of daughter ions (m/z=241) obtained by aflatoxin B1 samples respectively with a concentration of 10 ppb, a concentration of 5 ppb, a concentration of 1 ppb and a concentration of 0.5 ppb in one embodiment of the invention.
Figure 10:
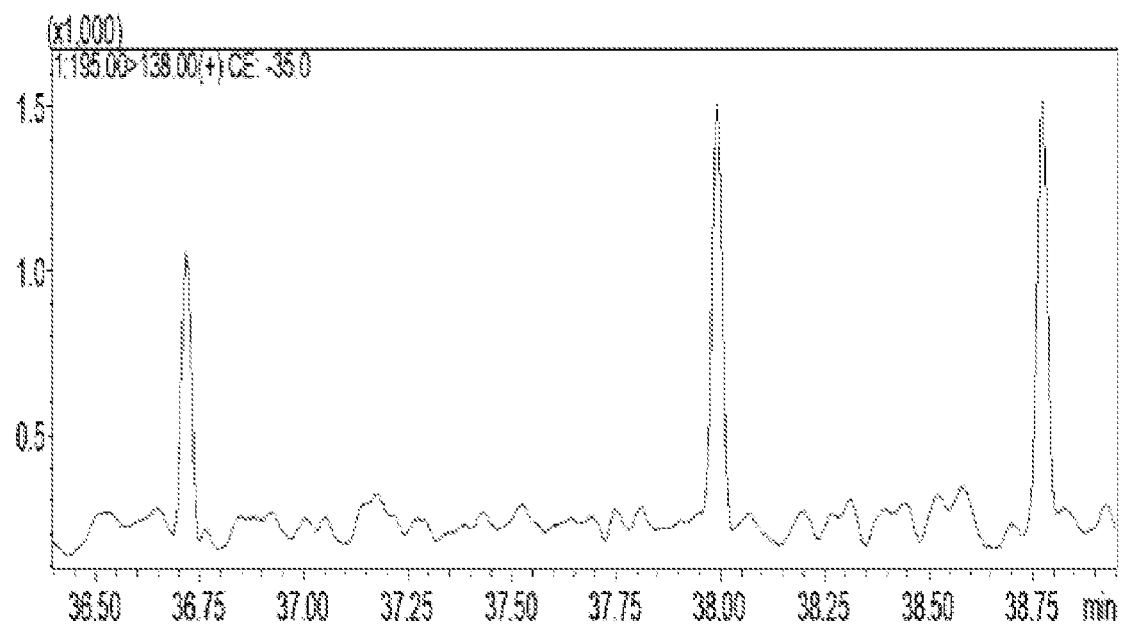
FIG. 10 is an ion current diagram of daughter ions obtained by a caffeine sample with a concentration of 10 ppb in FIG. 9.
Figure 11:
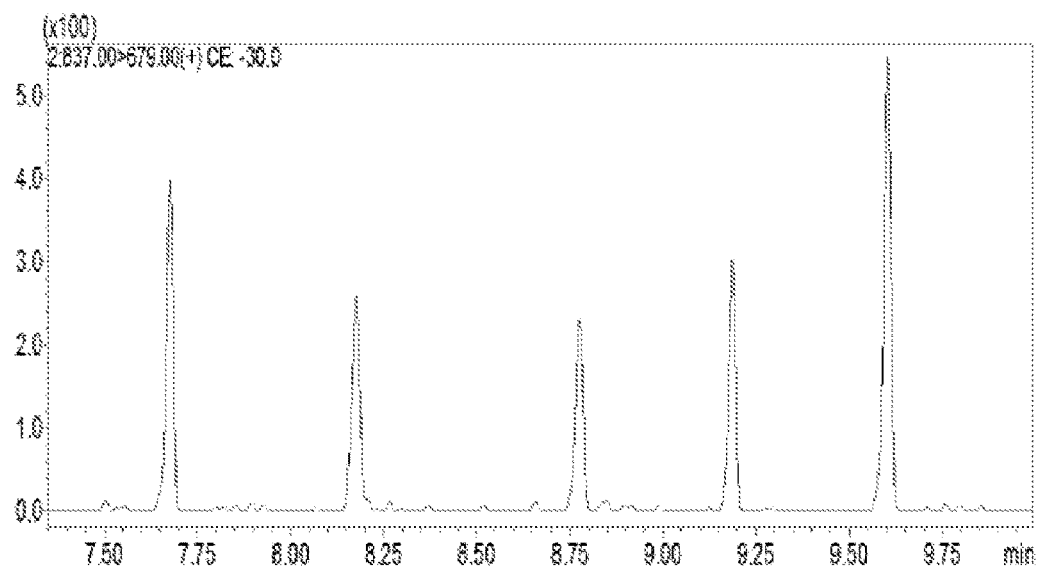
FIG. 11 is an ion current diagram of daughter ions obtained by a roxithromycin sample with a concentration of 20 ppb in FIG. 9.

To verify the effect of the ionization device 200 of the invention in improving the analysis sensitivity of the mass spectrometer, the mass spectrometer combining the ionization device 200 of the invention and a triple quadrupole mass spectrometer serving as the analysis assembly 204 is used to detect and analyze different samples in an MRM mode. FIG. 9-FIG. 11 are variation diagrams of the flow rate of obtained daughter ions with time.

Wherein, FIG. 9 is an ion current diagram of daughter ions (m/z=241) obtained by aflatoxin B1 samples respectively with a concentration of 10 ppb, a concentration of 5 ppb, a concentration of 1 ppb and a concentration of 0.5 ppb; FIG. 10 is an ion current diagram of daughter ions (m/z=138) obtained by a caffeine sample with a concentration of 10 ppb; FIG. 11 is an ion current diagram of daughter ions (m/z=679) obtained by a roxithromycin sample with a concentration of 20 ppb. Analysis results in all these ion current diagrams are obtained after the samples are added repeatedly.

As can be seen from FIG. 9-FIG. 11, stable signals with clear and distinct ion peaks and extremely high signal-to-noise ratios can be obtained after different samples are ionized by the ionization device 200 of the invention, and the sensitivity of measurement is improved.

To verify the effect of the ionization device 200 of the invention in improving the analysis reproducibility of the mass spectrometer, the mass spectrometer combining the ionization device 200 of the invention and the triple quadrupole mass spectrometer serving as the analysis assembly 204 is used to ionize a melamine sample in a Q3 SIM mode.

Figure 12:
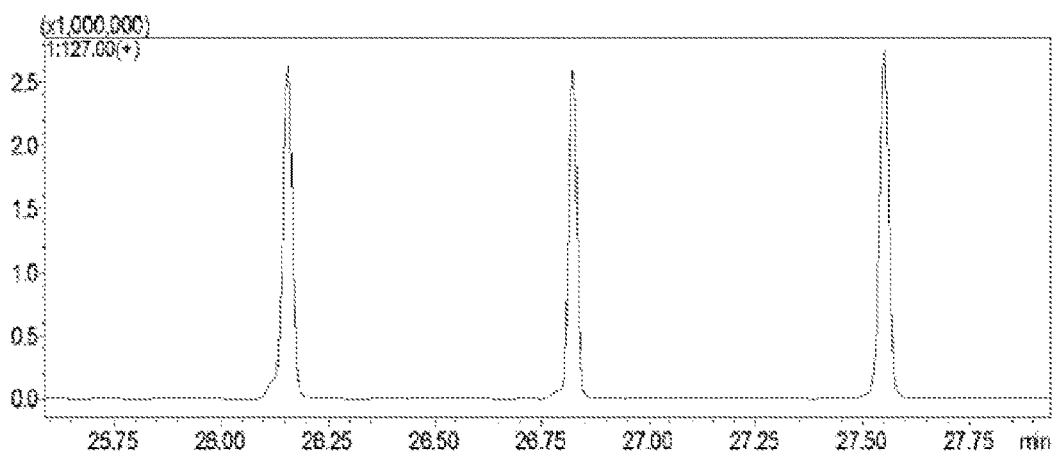
FIG. 12 illustrates signal responses obtained after a melamine sample with a concentration of 20 ppb in FIG. 9 is added three times.

FIG. 12 illustrates signal responses obtained after a melamine sample with a concentration of 20 ppb is added three times. As can be known by analysis, the relative standard deviation of the peak height is extremely small, which is only 2.7%. Thus, the proper relative positions of the ionization part 200B and the sampling desorption part 200A can improve the analysis reproducibility of the mass spectrometer.

It should be particularly pointed out that although the ionization device 200 is explained in conjunction with the analysis assembly 204 of the mass spectrometer in this embodiment, any ionization devices 200 comprising the sampling desorption part 200A and the ionization part 200B can fulfill the purposes of realizing rapid thermal desorption of the sample under the normal pressure through a simple device structure, ensuring stable ionization of the desorbed sample and providing stable to-be-measured ions for subsequent mass spectrometry of the invention. The description given in conjunction with the analysis assembly 204 is merely for the purpose of explaining this embodiment, and the analysis assembly 204 is not an indispensable essential technical feature of the invention.

Embodiment 2

This embodiment provides an ionization device applied to a direct-analysis mass spectrometer and a direct-analysis mass spectrometer using the ionization device. Referring to FIG. 2 again, the mass spectrometer in this embodiment comprises an ionization device 200 and an analysis assembly 204. The ionization device 200 comprises a sampling desorption part 200A and an ionization part 200B, wherein the sampling desorption part 200A comprises a sampling probe 201 and a heating assembly 202, and the tail of the sampling probe 201 is detachably mounted on the sampling desorption part 200A. The heating assembly 202 is a DC power supply and can heat the sampling probe 201 under the atmospheric pressure, and the sampling probe 201 can be rapidly heated by controlling the output power of the DC power supply serving as the heating assembly 202, to enable the heated sample to be rapidly desorbed on the surface of the sampling probe 201 to form a mobile phase in the form of gas, droplets, aerosol, atoms or molecule, which is then diffused or transferred to the ionization part 200B disposed downstream a mobile phase passageway to react with reaction particles generated by the ionization part 200B to be ionized, so that to-be-measured ions are formed.

Figure 3:
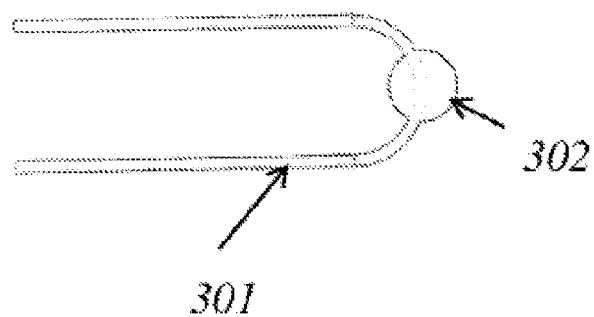
FIG. 3 is a structural diagram of a sampling probe in one embodiment of the invention.

This embodiment differs from Embodiment 2 in the top structure of the sampling probe 201. As shown in FIG. 3, the sampling probe 201 in this embodiment is made of a nichrome wire 301 which is bent into a U shape. In FIG. 3, a sample 302 is attached to the top end of the sampling probe 201. The nichrome wire 301 is used to making the sampling probe 201 mainly for the following reasons: when the heating assembly 202 heats the sampling probe 201, heat generated on a resistor is in direct proportion to the square of the resistance of the resistor, and to ensure that the electric energy of the DC power supply can be collected to be used to heat the sampling probe 201 rather than being dissipated on a wire, the resistance of the sampling probe 201 should to be increased. In an ideal condition, the resistance of the sampling probe 201 is in direct proportion to the length and resistivity of the material and is in inverse proportion to the cross-sectional area of the material. To increase the resistance of the sampling probe 201, the sampling probe 201 should be made of a material with a small cross-sectional area and a large resistivity. In addition, in some modes, for example, when the sample needs to be burnt out, the sampling probe 201 needs to be heated to an extremely high temperature (over 1000° C.), which put forwards an extremely high requirement for the heat resistance of the material. Considering all these factors, the nichrome wire 301 is used to make the sampling probe 201 in this embodiment. The normal-temperature resistivity of the nichrome wire is in connection with the composition. For example, the resistivity of Cr20Ni80 at 20° C. is 1.09E-6 $\Omega \cdot m$.

The sampling probe 201 made of the nichrome wire 301 has the following beneficial effects: for example, nichrome has appropriate ductility and hardness, wherein the appropriate ductility guarantees that the nichrome wire can be easily machined into a required shape, and in other preferred embodiments of the invention, the nichrome wire can be machined into a threaded sampling probe, which can easily acquire a liquid sample and increase the amount of samples acquired; and the appropriate hardness ensures that the sampling probe 201 will not deform in the sampling process, so that a short circuit caused by local deformation of the nichrome wire 301 is avoided, which may otherwise change the resistance of the sampling probe 201 and affect the heating rate or temperature control. Besides, a smaller cross-section is beneficial to the electrical properties of the material and guarantees a larger specific surface area and a smaller size, and the small size allows the sampling probe 201 to be heated to a very high temperature with little heat in the heating process; and the larger specific surface area can fulfill a better heat dissipation effect, so that once the current is cut off, the sampling probe 201 can return to the normal temperature in a shorter time, and the repeated analysis efficiency of the device is further improved.

In this embodiment, the cross-sectional area of the nichrome wire 301 is preferably less than 10 mm². Because the nichrome wire 301 is formed by bending a filament conductor, to guarantee the electrical and thermodynamic properties and mechanical properties of the material to prevent burnout or stress fractures caused by excessive thinness, the cross-sectional area of the conductor in this embodiment is preferably any one of 8-10 mm², 6-8 mm², and 2-4 mm², and is more preferably less than 1 mm² or is 1-2 mm².

In this embodiment, the cross-sectional shape of the nichrome wire 301 is circular. Because the sampling probe 201 needs to directly contact with the sample or a container frequently in the sampling process, the soft filament conductor may deform at the moment of contact. By adoption of the circular cross-section, the resistance will not change in case of excessive deformation, so that errors of the heating rate caused by the increase of the use frequency of the sampling probe are reduced.

It should be noted that although the sampling probe 201 in this embodiment is made of the nichrome wire 301, the sampling probe of the invention may also be made of other preferred heat-resistant conductors with a high resistivity. Similar to nichrome in this embodiment, other preferred materials include: metal elements including titanium, ferrum, cobalt, gallium, nickel, chromium, molybdenum, rhodium, iridium, chromium, tungsten, rhenium and molybdenum, or alloy materials of titanium, ferrum, cobalt, gallium, nickel, chromium, molybdenum, rhodium, iridium, chromium, tungsten, rhenium and molybdenum, or composites of these materials such as rhenium-tungsten alloy.

In this embodiment, the material has a higher resistivity compared with a copper wire adopted in this embodiment, and all materials with the resistivity higher than the common resistivity of the copper wire may be referred to as high-resistivity materials. To be specific, the resistivity of the material in the invention is preferably greater than 4E-8 $\Omega \cdot m$.

In this embodiment, the DC power supply is used as the heating assembly 202 to heat the sampling probe 201, and when the output power or output current of the DC power supply is maximized, the heating rate of the sampling probe 201 will reach the peak. When the sampling probe 201 initially at the indoor temperature is heated with the maximum power or maximum output current, the heating rate of the sampling probe 201 can reach 100 K/s, that is, the sampling probe 201 can be heated to 100° C. in 1 s. When the measured sample 302 solvent is water, a small amount of sample 302 liquid in contact with the sampling probe 201 will be rapidly heated to boiling, which is similar to a local explosion that can split the liquid sample 302 into a plurality of droplets, and thus, the to-be-measured sample is carried away from the surface of the sampling probe 201.

Such desorption is different from a traditional thermal desorption process in that most samples 302 are desorbed by an explosion induced by local boiling of the samples instead of being desorbed by evaporation or sublimation induced by gradual heating. Since most samples 302 do not need to undergo a gradual heating process, this desorption method can protect the molecular structures of some samples, that are intolerant with a high temperature, against destruction in the heating process, so that the application range of the ionization device 200 and the range of varieties of samples that can be measured by the mass spectrometer are expanded. In addition, the sample 302 can be desorbed without a phase change from a liquid or solid phase to gaseous molecules, so that after being desorbed, the sample can still be in the form of droplets or aerosol.

In the process of accomplishing the invention, the inventor finds that such desorption, similar to explosion, of the sample can also fulfill some unexpected effects. Desorption of a large number of samples can be rapidly completed by means of the explosion, and to-be-measured samples generated after desorption can be rapidly analyzed by analysis and test devices such as the ionization part 200B and the analysis assembly 204, so that on the one hand, the overall analysis efficiency is improved; and on the other hand, stable instant signals can be generated by rapidly analyzing a large number of samples through the analysis and test devices, thus increasing the signal-to-noise ratio of signals received by the mass spectrometer or the ion mobility spectrometer and improving the test sensitivity.

Clearly, according to different varieties of samples and different heating rates, a mass-transfer liquid generated by rapid heating may also be, but not limited to, in the form of aerosol, gas molecules, ions, atoms, or the like. The heating rate of the sampling probe 201 in a specified time is preferably 100-150 K/s, 150-200 K/s, or 200-250 K/s, or is more preferably 200-250 K/s. More preferably, the heating rate of the sampling probe 201 in a specified time is 250-300 K/s or is greater than 200 K/s, and is further preferably greater than 300 K/s.

In other preferred embodiments of the invention, the sample 302 may also be slowly heated by controlling the output power of the heating assembly 202. The user can properly control the heating rate according to actual sample varieties and analysis requirements to finally obtain a to-be-measured ion current, which is suitable for the characteristics of the sample and beneficial to analysis. The electric-heating desorption device 200A with an controllable heating rate of the invention has outstanding sample adaptability, thus greatly expanding range of varieties of analyzed samples.

In this embodiment, the DC power supply used as the heating assembly 202 can provide stable currents to facilitate stable and rapid heating, and a dry battery or other mobile storage batteries can be used as the heating assembly, so that the portability is improved, and daily maintenance is facilitated.

It should be noted that although the DC power supply is used as the heating assembly 202 in this embodiment, other power supplies, such as AC power supplies, can also be used as the heating assembly 202, and such simple transformations of the power supply made without deviating from the concept of the invention should also fall within the protection scope of the invention.

In this embodiment, the ionization part 200B is an electrospray ion source which, as an indoor-pressure ionization source, is more suitable for medium-polarity and strong-polarity samples and can generate charged droplets, which are then mixed and react with the desorbed sample to ionize the sample, and then the ionized sample is transferred to the analysis assembly inlet 203. The DC power supply in this embodiment can further reduce possible interference on an electric field of the ion source.

This embodiment further provides a method for analyzing the components of a sample by means of the mass spectrometer with the ionization device 200. The method comprises: First, the sampling probe 201 is dismantled from the sampling desorption part 200A and acquires a sample by way of point contact, dipping, soaking or wiping, and the sample 302 adheres to the pointed end of the sampling probe 201 under the effect of surface capillary force and surface tension of a filament;

the sampling probe 201 is placed back onto a heating station of the mass spectrometer, and then a cover is closed;

a power switch of the heating assembly 202 is turned on, an appropriate output power of the heating assembly 202 is selected, and then the sample is heated; under the appropriate output power, the sampling probe 201 can be rapidly heated to split the desorbed sample into a plurality of droplets, and the to-be-measured sample is carried away from the sampling probe 201;

the desorbed sample is transferred to the ionization part 200B, and charged droplets generated by the ionization part 200B are mixed and react with the desorbed sample to ionize the sample, so that to-be-measured ions are formed;

the to-be-measured ions enter the analysis assembly 204 via the analysis assembly inlet 203, and an analysis result is obtained by quality analysis of the sample ions.

By performing sample analysis by means of the mass spectrometer with the ionization device 200 through the above-mentioned steps, the desorption rate of samples can be increased, the analysis efficiency can be improved, and a thermospray process of the samples can be induced to prevent some samples, prone to thermal decomposition, against dissociation under a high temperature, thus reducing the destruction to the molecular structures of the samples and expanding of the varieties of measured samples. For example, the ionization device 200 in this embodiment can be used to ionize polypeptide samples.

Figure 13:
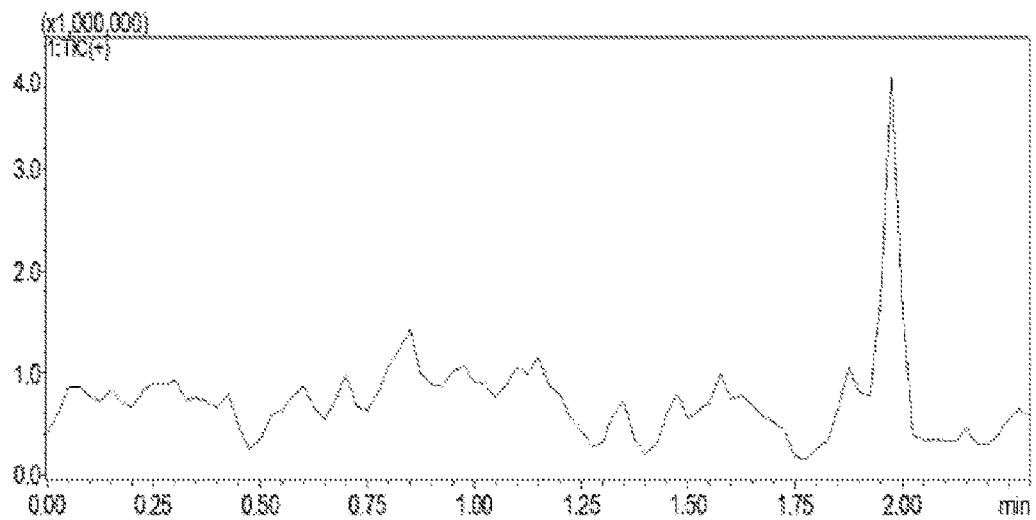
FIG. 13 is a total ion current diagram of double-charge ions obtained by a bradykinin sample with a concentration of 50 ppb in one embodiment of the invention.
Figure 14:
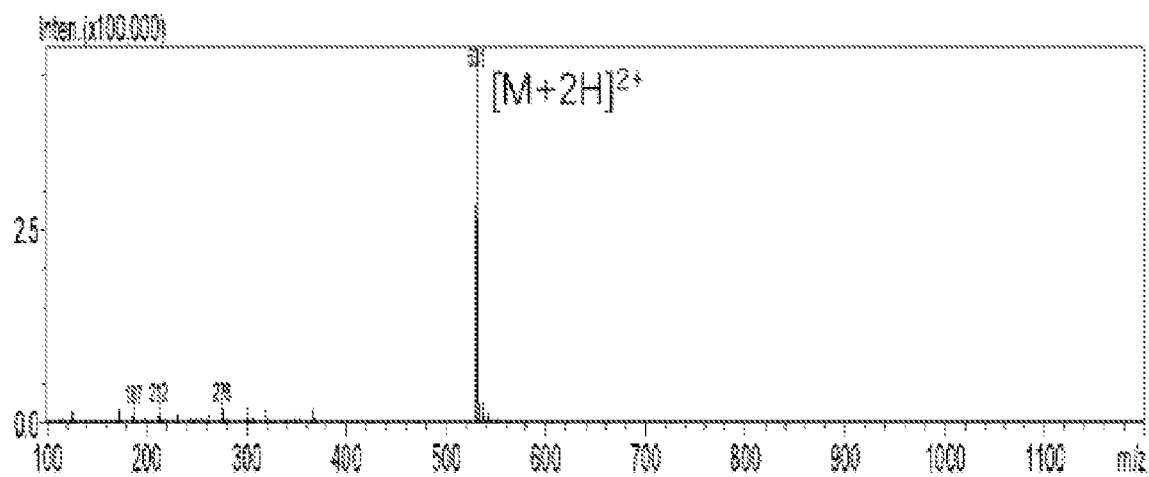
FIG. 14 is a mass spectrogram of the double-charge ions obtained by the bradykinin sample with the concentration of 50 ppb in FIG. 13.

FIG. 13-FIG. 14 illustrate experimental results obtained after polypeptide samples are ionized by the ionization device 200 of the invention, wherein FIG. 13 is a total ion current diagram of double-charge ions (m/z=531) obtained by a bradykinin sample with a concentration of 50 ppb, and FIG. 14 is a mass spectrogram of the double-charge ions (m/z=531) obtained by the bradykinin sample with the concentration of 50 ppb.

As can be seen from the figures, the ionization device 200 provided by this embodiment of the invention can prevent polypeptide against dissociation in the heating process, and an obtained signal has a high signal-to-noise ratio and basically has no impurity ion peak.

It should be noted that the to-be-measured sample that can induce the thermospray process by means of a high heating rate is not limited to a liquid or solution sample. For example, when the to-be-measured sample is a solid sample, the solid sample can be converted into a dispersed system capable of inducing the thermospray process through the following steps: the to-be-measured sample is dispersed in liquid to form a dispersed system in the form of a solution, suspended oil, emulsion or micro-emulsion; and/or, liquid is applied to the sampling probe to convert the to-be-measured sample into a dispersed system in the form of a solution, suspended oil, emulsion or micro-emulsion. By processing the solid sample in this way, thermal desorption of liquid samples can be realized, and thermal decomposition of solid samples is avoided.

In other embodiments of the invention, in the step of actively acquiring a sample by the sampling probe, the sampling probe can be heated to be used for sampling. The heated sampling probe can carry out some sampling operations that cannot be performed by a common-temperature probe, for example, the heated sampling probe can burn the surface of an object and then acquire a sample below the surface of the object. Because the sampling probe is detachably connected to the sampling desorption part, the sampling probe can be preheated to acquire a sample after being dismantled from the sampling desorption part; or, the sampling probe is continuously heated to acquire a sample without being dismantled from the sampling desorption part.

Embodiment 3

Figure 4:
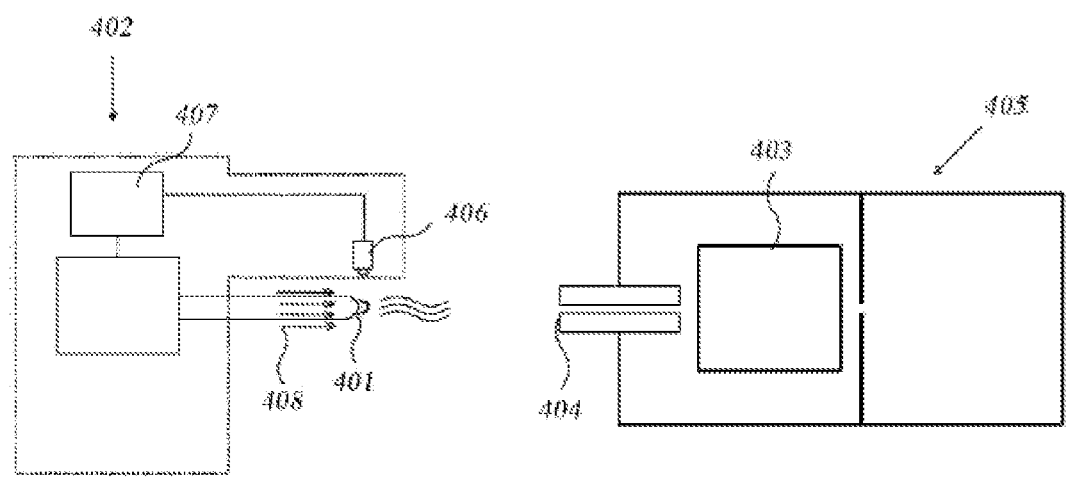
FIG. 4 is a structural diagram of a mass spectrometer in another embodiment of the invention.

Referring to FIG. 4, an ionization device and a direct-analysis mass spectrometer in this embodiment differ from the ionization device and the mass spectrometer in Embodiment 2 mainly in the following aspect: in this embodiment, the heating assembly 402 further comprises a temperature detection part 406 and a temperature control part 407, the temperature detection part is a temperature sensor 406 disposed near the sampling probe 401 and is able to acquire a signal reflecting the temperature of the sampling probe 401 such as a heat radiation signal and convert the signal into an electric signal which is in turn transmitted to the temperature control part 407, and the temperature control part 407 is able to determine the real-time temperature of the sampling probe 401 according to the electric signal. Meanwhile, the temperature control part 407 has an operation function, can obtain a proper temperature control program according to the real-time temperature, and can control on-off and output power or output current of the heating assembly 402 through the temperature-control program to heat, cool or maintain the sampling probe 401 according to a preset temperature curve.

The temperature detection part 406 and the temperature control part 407 can realize separation of some mixture samples. For example, when a mixture sample is directly analyzed, if the mixture sample contains two components with similar boiling points, one of the two components is a to-be-analyzed component and the other component with the similar boiling point may disturb the to-be-analyzed component, the two components need to be separated by a certain way to ensure that the two components sequentially enter the analysis assembly 405 via the analysis assembly inlet 404.

The temperature detection part 406 and the temperature control part 407 in this embodiment can separate two components in a mixture sample by means of accurate temperature control. For example, two heating modules (not shown) may be disposed in the temperature control part 406, wherein a first heating module 406A is able to heat the mixture sample to a temperature close to the boiling point of one component and maintain the temperature for a period of time to enable the component to be desorbed from the mixture sample; and then, the second heating module 406B heats the sampling probe 401 to another high temperature to enable the other component to be desorbed from the mixture sample, and then, corresponding analysis and detection steps are performed. Of course, if the boiling point of a to-be-measured object is low, the object can be directly heated by the first heating module 406A to a temperature close to the boiling point to enable the object to be desorbed.

In this embodiment, the number of the heating modules will not limit the protection scope of the invention. Those skilled in the art can select a proper number of heating modules according to actual sample varieties by comprehensive consideration of the factors such as the number of components of a mixture and the boiling point of an interfering component. Of course, in some scenes where temperature control is implemented by a program, the heating curve can be set more flexibly to reduce the influence of the interfering component on a detection signal so as to improve the measurement sensitivity.

In addition, after the sample is desorbed, the temperature control part 407 can heat the sampling probe 401 to an extremely high temperature through the third heating module to burn out the sample on the sampling probe 401. It is a simple and rapid method to maintain the surface of the sampling probe 401 clean by burning out the sample left on the sampling probe 401, so that cross contamination between different samples can be avoided when the sampling probe 401 is used to acquire different varieties of samples, and analysis results are less likely to be affected by contaminants.

In other preferred embodiments of the invention, the heating assembly 402 can heat the sampling probe 401 to be over 1000° C. A high heating temperature can burn out the sample after measurement and can realize thermal desorption of some non-volatile samples, so that the range of verities of samples that can be analyzed by the device is widened.

Another significant difference of this embodiment from Embodiment 2 is the design of a passageway system. As shown in FIG. 4, after being thermally desorbed, the sample is carried and conveyed by carrier gas 408 and enters an ionization part 403 disposed in an analysis assembly 405 via an analysis assembly inlet 404, and the ionization part 403 adopts a glow discharge ion source, which can rapidly ionize medium-polarity or weak-polarity samples and then convey the samples to the analysis assembly 405 for mass analysis. This passageway design is quick and efficient and further improves the efficiency in the analysis process. The glow discharge ion source in this embodiment is a low-pressure glow discharge ion source and is disposed inside the analysis assembly 405, and the working pressure of the glow discharge ion source can be reasonably selected as actually needed and preferably is 50 Pa-500 Pa, 500 Pa-5000 Pa or 5 kPa-50 kPa.

To sum up, the ionization device in this embodiment has an accurate temperature-control system, flexible heating modules, a high upper temperature limit and an efficient passageway design, so that the ionization device can be suitable for more varieties of samples, avoids contamination of the samples, and improves the analysis efficiency.

Embodiment 4

An ionization device and a mass spectrometer in this embodiment differ from the ionization devices and the mass spectrometers in the above embodiments in the heating manner.

Figure 5:
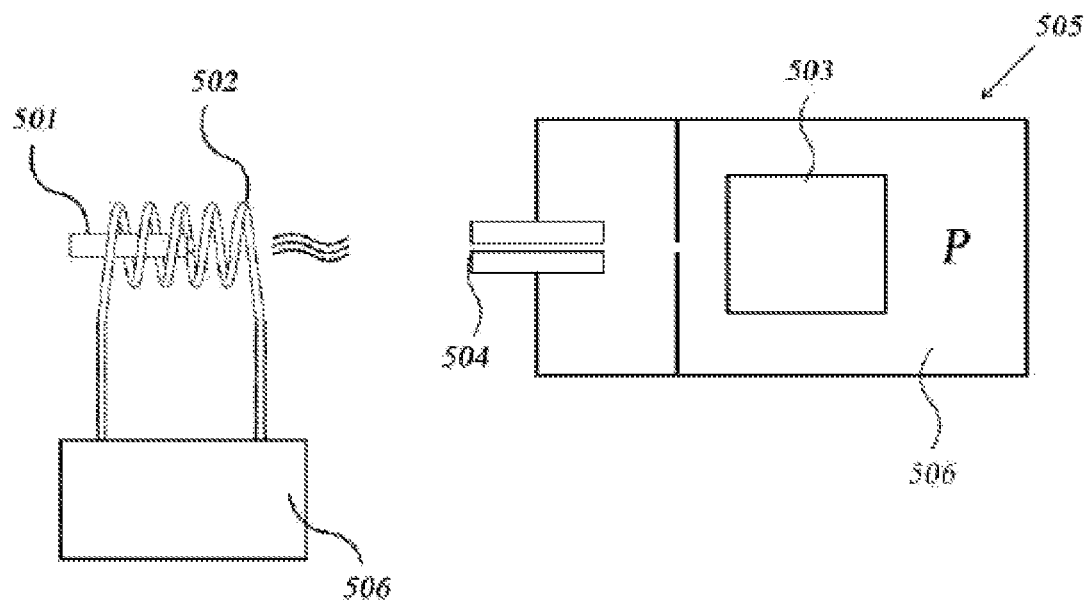
FIG. 5 is a structural diagram of a mass spectrometer in other embodiments of the invention.

Referring to FIG. 5, the heating assembly 502 in this embodiment is a solenoid 502 connected to a high-frequency current or voltage source 506, and the sampling probe 501 is made of a filament-shaped or rod-shaped ferromagnetic conductor and is disposed on the central axis of the solenoid 502 during operation. In this way, the change rate of magnetic flux around the sampling probe 501 can be increased, thus improving the induction current in the sampling probe 501 and increasing the heating rate of the sampling probe 501.

The sampling probe 501 in this embodiment can also be rapidly heated by controlling the output power of the high-frequency current or voltage source 506, so as to fulfill a rapid heating effect the same as that achieved by direct heating with currents in Embodiment 2.

In this embodiment, the high-frequency current or voltage source 506 is used as the heating assembly 502, and because the electromagnetic field generated by the high-frequency current or voltage source 506 may disturb the ionization part 503, the ionization part 503 in this embodiment is disposed inside the analysis assembly 506.

In addition, the ionization part 503 in this embodiment is a low-pressure ionization source. The low-pressure ionization source is disposed in a low-pressure region 506 of the analysis assembly 505, and after entering the analysis assembly 505 via the analysis assembly inlet 504, the sample is ionized by the ionization part 503 disposed in the analysis assembly 505. The ionization part 503 and devices in the analysis assembly 505 such as a mass analyzer are received in the low-pressure region 506, so that the structure is compact, and the layout is reasonable.

The low-pressure ionization source disposed in the low-pressure region 506 has the following beneficial effects: first, the ion source is arranged inside, so that the working stability of the ion source can be improved, the ion source is prevented against interference from the external environment, contamination and damage are reduced, and the service life is prolonged; second, such arrangement fulfills better updating flexibility; according to the ionization device in this embodiment, an indoor-pressure ionization source can be additionally arranged outside the analysis assembly 505 as actually needed to ionize different components in samples, so that more sample information can be obtained by the device, and the device can adapt to more varieties of samples. The air pressure P of the low-pressure region 506 in this embodiment is preferably less than 50 kPa, and is further preferably 50 Pa-500 Pa, 500 Pa-5000 Pa or 5 kPa-50 kPa.

Figure 6:
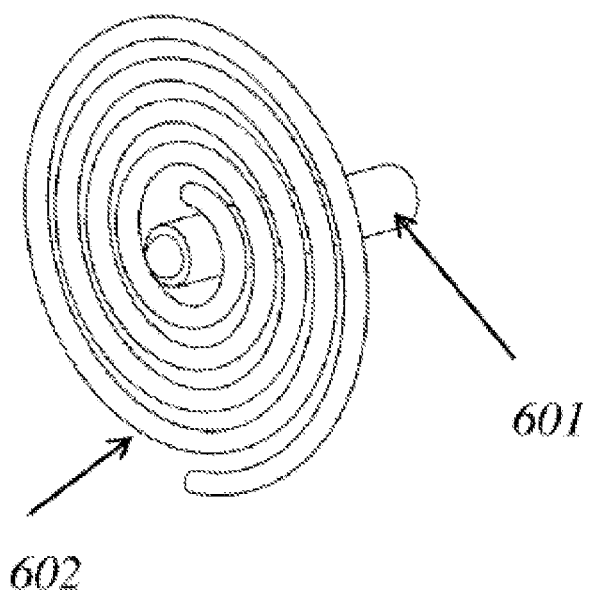
FIG. 6 is a structural diagram of a heating assembly in one embodiment of the invention.

In other preferred embodiments of the invention, a vortex tube shown in FIG. 6 may be used as the heating assembly 602, and the sampling probe 601 is preferably arranged on the central axis of the vortex tube to improve the heating efficiency.

Embodiment 5

This embodiment provides an ion mobility spectrometer, which is structurally similar in to the mass spectrometer in Embodiment 1 and differs from the mass spectrometer in Embodiment 1 mainly in the following aspect: an ion mobility analysis assembly replaces a mass spectrometry assembly to serve as the analysis assembly.

According to the ionization device 200 in this embodiment, rapid thermal desorption of samples under the normal pressure can be realized through a simple device structure, stable ionization of the samples after desorption can be ensured, a stable to-be-measured ion source is provided for subsequent ion mobility analysis, and the reproducibility and sensitivity of ion mobility analysis are improved.

The ionization device of the invention can be applied to various ion analyzers and can improve the analysis speed, sensitivity and signal reproducibility of the analyzers.

Figure 7:
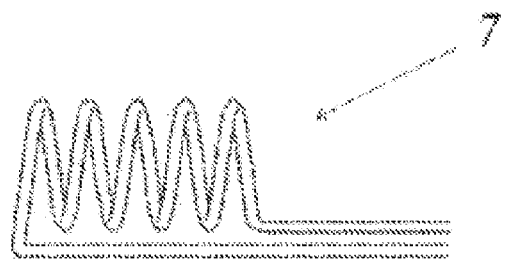
FIG. 7 is a structural diagram of a sampling probe in another embodiment of the invention.
Figure 8:
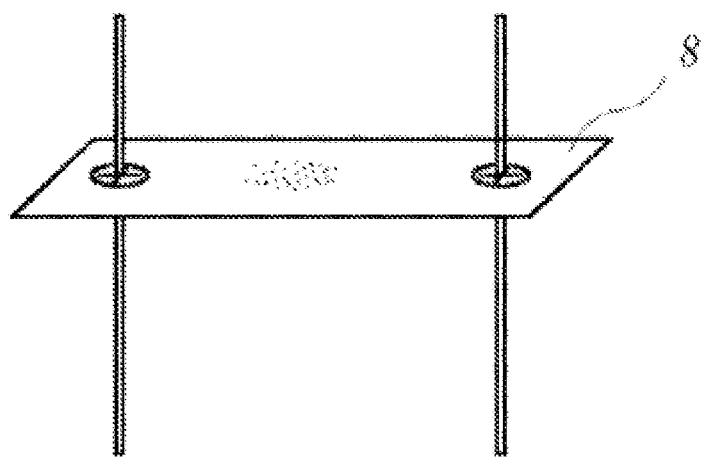
FIG. 8 is a structural diagram of a sampling probe in other embodiments of the invention.

In addition, the sample probe in this embodiment may be in other shapes including, but not limited to, a filament shape, a sheet shape, a tubular shape, a strip shape and a membrane shape, and the structures shown in FIG. 7-FIG. 8 are merely illustrative ones. Wherein, the sampling probe 7 in FIG. 7 is formed by a bent metal wire, and the quantity of acquired liquid can be adjusted by controlling the radius of curvature of the bent metal wire; and the sampling probe 8 in FIG. 8 is a metal sheet. In other embodiments, the sampling probe may be preferably in the shape of a boat such as a tantalum boat, and can acquire a solid sample by scooping or acquire a liquid sample by dipping.

It should be particularly pointed out that the filament shape, the sheet shape, the tubular shape, the strip shape and the membrane shape illustrated in this embodiment are not all possible shapes of the sampling probe, those skilled can adopt sampling probes in other shapes or make transformations to the sampling probe in the above-mentioned shapes as actually needed, and all shape designs that can fulfill a rapid heating effect of the device should fall within the protection scope of the invention.

It should be noted that although the ionization part adopts the electrospray ion source and the glow discharge source in the aforementioned embodiments, those skilled in the art can adopt other types of ion sources which include, but are not limited to, a dielectric barrier discharge ion source, a corona discharge ion source and a photoelectric ion source according to the actual condition. Reaction particles generated by different ionization parts include, but are not limited to, one or the combination of several of charged droplets, ions, electrons, photons and metastable atoms.

Although the technical solution of the invention has been described above in conjunction with the accompanying drawings, those skilled in the art would appreciate that the protection scope of the invention is not limited to these specific embodiments and can make equivalent modifications or substitutions to relevant technical characteristics without deviating from the principle of the invention, and all these modifications or substitutions should also fall within the protection scope of the invention.

What is claimed is:

1. An ionization device, comprising a sampling desorption part and an ionization part, the sampling desorption part comprising a sampling probe and a heating assembly, wherein:

the sampling probe is detachably mounted on the sampling desorption part and is used to actively acquire a sample;

the heating assembly is used to heat the sampling probe under or near a normal pressure after a sampling process is finished to enable the sample to be desorbed on a surface of the sampling probe; and the ionization part is arranged downstream the sampling desorption part in a mass transfer direction of the sample, wherein the ionization device is configured such that in operation, the sampling probe is dismantled from the sampling desorption part, actively acquires the sample by directly touching the sample after being dismantled from the sampling desorption part, is assembled back onto the sampling desorption part to realize the sampling process, and is directly heated by the heating assembly under or near the normal pressure after being reassembled back onto the sampling desorption part.

2. The ionization device according to claim 1, wherein a heating rate of the sampling probe within a specified time in a heating process of the sampling probe is over 100 K/s.

3. The ionization device according to claim 1, wherein the heating assembly is an AC or DC power supply.

4. The ionization device according to claim 3, wherein the heating assembly is a dry battery, a storage battery or a lithium battery.

5. The ionization device according to claim 1, wherein a cross-sectional area of the conductor is less than 10 mm$^2$, and a cross-sectional shape of the conductor is circular or rectangular.

6. The ionization device according to claim 1, wherein the heating assembly comprises a temperature control part and a temperature detection part, the temperature control part is able to control on-off and/or power of the heating assembly according to temperature information fed back by the temperature detection part.

7. The ionization device according to claim 6, wherein the temperature control part at least comprises a first heating module and a second heating module, the first heating module is able to control and heat the sampling probe to enable a first component on the sampling probe to be desorbed, and the second heating module is able to control and heat the sampling probe to enable a second component on the sampling probe to be desorbed.

8. The ionization device according to claim 6, wherein the temperature control module further comprises a third heating module, and the third heating module is able to control and heat the sampling probe to enable the sample on the sampling probe to be burned out.

9. The ionization device according to claim 1, wherein the heating assembly is able to heat the sampling probe to be over 1000° C.

10. The ionization device according to claim 1, wherein the ionization part comprises at least one of an electrospray ion source, a glow discharge ion source, a dielectric barrier discharge ion source, a corona discharge ion source and a photoelectric ion source.

11. The ionization device according to claim 1, wherein reaction particles generated by the ionization part include at least one of charged droplets, ions, electrons, photons and metastable atoms.

12. The ionization device according to claim 1, wherein the ionization part is an indoor-pressure ionization source and/or a low-pressure ionization source.

13. The ionization device according to claim 12, wherein a working pressure of the low-pressure ionization source is 50 Pa-500 Pa, 500 Pa-5000 Pa, or 5 kPa-50 kPa.

14. A mass spectrometer, comprising the ionization device according to claim 1.

15. An ion mobility spectrometer, comprising the ionization device according to claim 1.

16. An ionization method, comprising the following steps:
actively acquiring a sample by a sampling probe;
heating the sampling probe by a heating assembly under a normal pressure after a sampling process is finished to enable the sample to be desorbed on a surface of the sampling probe;
transferring the desorbed sample to an ionization part arranged downstream in a mass transfer direction of the sample; and
ionizing the desorbed sample,
wherein said actively acquiring the sample by the sampling probe comprises:
dismantling the sampling probe from a sampling desorption part;
actively acquiring the sample by the sampling probe directly touching the sample after being dismantled from the sampling desorption part;
assembling the sampling probe back onto the sampling desorption part to realize the sampling process; and
wherein said heating the sampling probe comprises directly heating the sampling probe by the heating assembly under or near the normal pressure after being reassembled back onto the sampling desorption part.

17. The ionization method according to claim 16, wherein a heating rate of the sampling probe within a specified time in a heating process of the sampling probe is over 100 K/s.

18. The ionization method according to claim 16, wherein the heating process of the sampling probe at least comprises a first heating stage and a second heating stage, a first component on the sampling probe is desorbed in the first heating stage, and a second component on the sampling probe is desorbed in the second heating stage.

19. The ionization method according to claim 16, wherein the heating process of the sampling probe further comprises a third heating stage in which the sample on the sampling probe is burned out.

20. The ionization method according to claim 16, wherein in the step of actively acquiring a sample by a sampling probe, the sampling probe is heated to acquire the sample.

21. The ionization device according to claim 1, wherein the sampling probe is made of a filament-shaped, sheet-shaped, tubular-shaped, strip-shaped or membrane-shaped conductor, and the conductor is made of a metal element including titanium, ferrum, cobalt, gallium, nickel, chromium, rhodium, iridium, tungsten, rhenium and molybdenum, or one or more of alloy materials of titanium, ferrum, cobalt, gallium, nickel, chromium, rhodium, iridium, tungsten, rhenium and molybdenum.

* * * * *